United States Patent
Sugiura et al.

(10) Patent No.: US 11,027,390 B2
(45) Date of Patent: Jun. 8, 2021

(54) MACHINE TOOL SYSTEM AND STOCKER

(71) Applicant: OKUMA Corporation, Aichi (JP)

(72) Inventors: Hiroyuki Sugiura, Aichi (JP); Yosuke Ichigi, Aichi (JP)

(73) Assignee: OKUMA CORPORATION, Aichi (JP)

(*) Notice: Subject to any disclaimer, the term of this patent is extended or adjusted under 35 U.S.C. 154(b) by 184 days.

(21) Appl. No.: 16/285,402

(22) Filed: Feb. 26, 2019

(65) Prior Publication Data
US 2019/0262957 A1 Aug. 29, 2019

(30) Foreign Application Priority Data
Feb. 28, 2018 (JP) .............................. JP2018-035679

(51) Int. Cl.
| | |
|---|---|
| B23Q 11/08 | (2006.01) |
| B23Q 7/04 | (2006.01) |
| E06B 11/02 | (2006.01) |
| B25J 9/06 | (2006.01) |
| B25J 9/16 | (2006.01) |
| B23P 23/02 | (2006.01) |
| B25J 19/06 | (2006.01) |

(52) U.S. Cl.
CPC .......... *B23Q 11/0891* (2013.01); *B23P 23/02* (2013.01); *B23Q 7/046* (2013.01); *B25J 9/1694* (2013.01); *B25J 19/06* (2013.01); *E06B 11/02* (2013.01)

(58) Field of Classification Search
CPC .......... B25J 9/06; E04H 17/00; E04H 17/013; E06B 11/02; B23Q 11/0891; B23Q 7/04
See application file for complete search history.

(56) References Cited

U.S. PATENT DOCUMENTS

| | | | | |
|---|---|---|---|---|
| 4,782,567 A * | 11/1988 | Kanaya | ................... | B23Q 7/04 29/33 P |
| 5,897,430 A * | 4/1999 | Haller | ................ | B23Q 11/0891 451/451 |
| 6,340,282 B1 * | 1/2002 | Bar | ....................... | B23P 19/001 414/416.07 |
| 6,675,549 B1 * | 1/2004 | Kaneda | ................ | B23Q 11/148 52/749.1 |
| 2008/0086237 A1 * | 4/2008 | Rebstock | ............... | B25J 9/0084 700/248 |

(Continued)

FOREIGN PATENT DOCUMENTS

| | | |
|---|---|---|
| JP | S6199450 U | 6/1986 |
| JP | 2015205385 A | 11/2015 |

(Continued)

*Primary Examiner* — Thomas Randazzo
(74) *Attorney, Agent, or Firm* — Cantor Colburn LLP (57) ABSTRACT

A machine tool system includes a machine tool having a processing chamber covered by a cover and a door for covering or uncovering an opening formed on the cover; a stocker for being removably mounted on the machine tool to thereby define a storage space outside the processing chamber; and a robot having a movement range spanning the storage space and the processing chamber when the stocker is mounted on the machine tool. In the machine tool mentioned above, the stocker includes a safety fence that defines, in cooperation with the outer surface of the machine tool, a protective space when the stocker is mounted on the machine tool. The protective space is a space for accommodating the storage space.

7 Claims, 7 Drawing Sheets

(56) References Cited

U.S. PATENT DOCUMENTS

| | | | |
|---|---|---|---|
| 2008/0131239 A1* | 6/2008 | Rebstock | B25J 9/00 414/225.01 |
| 2010/0143082 A1* | 6/2010 | Wang | H01L 21/67766 414/222.02 |
| 2011/0052366 A1* | 3/2011 | Bonin | B25J 9/1676 414/800 |
| 2015/0308176 A1 | 10/2015 | Oda | |
| 2016/0067782 A1* | 3/2016 | Fujimoto | B23Q 3/15513 483/19 |
| 2016/0112694 A1* | 4/2016 | Nishi | G01B 11/14 348/47 |
| 2017/0096851 A1* | 4/2017 | Saitou | E05F 15/603 |
| 2017/0298531 A1* | 10/2017 | Mukaiyama | C25D 7/123 |
| 2017/0326700 A1 | 11/2017 | Morimura | |
| 2018/0065208 A1* | 3/2018 | Mori | B23Q 3/15506 |
| 2018/0141174 A1* | 5/2018 | Mori | B23K 26/342 |
| 2018/0161978 A1* | 6/2018 | Naitou | B25J 5/007 |
| 2018/0169816 A1* | 6/2018 | Hori | H04N 7/181 |
| 2018/0207762 A1* | 7/2018 | Kawabe | B23Q 11/0053 |
| 2018/0243920 A1* | 8/2018 | Hashimoto | B25J 9/1628 |
| 2018/0354083 A1* | 12/2018 | Thorwarth | B62D 65/18 |
| 2019/0019709 A1* | 1/2019 | Rebstock | H01L 21/67769 |
| 2020/0262015 A1* | 8/2020 | Takada | B23Q 3/15526 |

FOREIGN PATENT DOCUMENTS

| | | | |
|---|---|---|---|
| JP | 2017064875 A | 4/2017 | |
| JP | 2017202548 A | 11/2017 | |

* cited by examiner

| DOOR SENSOR | STOCKER SENSOR | PROCESSING MECHANISM | ROBOT |
|---|---|---|---|
| CLOSED | MOUNTED | NOT RESTRICTED | NOT RESTRICTED |
| CLOSED | DEMOUNTED | NOT RESTRICTED | NOT RESTRICTED |
| OPEN | MOUNTED | RESTRICTED | NOT RESTRICTED |
| OPEN | DEMOUNTED | RESTRICTED | RESTRICTED |

| DOOR SENSOR | STOCKER SENSOR | PROCESSING MECHANISM | ROBOT |
|---|---|---|---|
| CLOSED | MOUNTED | NOT RESTRICTED | NOT RESTRICTED |
| CLOSED | DEMOUNTED | NOT RESTRICTED | RESTRICTED |
| OPEN | MOUNTED | RESTRICTED | NOT RESTRICTED |
| OPEN | DEMOUNTED | RESTRICTED | RESTRICTED |

FIG. 10

MACHINE TOOL SYSTEM AND STOCKER

CROSS REFERENCE TO RELATED APPLICATION

The present application claims priority under 35 U.S.C. § 119 to Japanese Patent Application No. 2018-035679 filed on Feb. 28, 2018, which is incorporated herein by reference in its entirety including the specification, claims, drawings, and abstract.

TECHNICAL FIELD

This specification discloses a stocker that provides a storage space outside a processing chamber, and a machine tool system including the stocker, a machine tool, and a robot.

BACKGROUND

A typical machine tool has a processing chamber covered by a cover. Since the space inside the processing chamber is limited, a stocker for implementing an additional storage space outside the machine tool may be mounted, for example, so that workpieces before or after processing, tools for exchange, and jigs are stored in the stocker.

Conventionally, machine tools have been demanded to implement further automation and manpower saving. In this view, installation of a robot for executing a variety of processing operations in or around a machine tool has been suggested. For example, Patent Document 1 discloses a machine tool that includes a multi-joint robot for a variety of processing operations installed inside the processing chamber of a machine tool. In Patent Document 1, the variety of processing operations to be executed by the multi-joint robot include, for example, transportation of workpieces to outside the processing chamber.

Robots capable of moving workpieces to outside the processing chamber, such as the robot disclosed in Patent Document 1, enable further automation and manpower saving. In particular, a robot that moves in an area spanning a processing camber and a storage space implemented by a stocker can carry workpieces, tools, and jigs to inside and outside the processing chamber, for example. This enables further automation and manpower saving.

CITATION LIST

Patent Literature

Patent Document 1: JP 2017-202548 A

According to the laws or standards, industrial robots shall be collaborative robots or shall be physically separated from people by bars or fences. Collaborative robots refer to robots that can operate in cooperation with people, including, for example, robots whose speed and distance to people can be monitored and/or whose torque and pressure to apply can be regulated.

Hence, when it is desired to have a robot move to a stocker outside a processing chamber, as described above, it is necessary that the area where the robot moves be encircled by bars or a fence for separation from people or that the robot be a collaborate robot. A collaborate robot should be equipped with expensive sensors, such as laser range-finders for detection of distances to people and sensors for detection of torque. Meanwhile, permanent installation of bars and fences near a machine tool hinders access to the inside of the machine tool (inside the processing chamber), which deteriorates operability of an operator.

In view of the above, this specification discloses an inexpensive machine tool system and a stocker for use with the machine tool system, in which the machine tool system is equipped with the stocker, a machine tool, and a robot and does not deteriorate the operability.

SUMMARY

A machine tool system disclosed in this specification includes a machine tool including a processing chamber and a door, the processing chamber being covered by a cover having an opening, the door for covering or uncovering the opening; a stocker for being removably mounted on the machine tool to thereby provide a storage space outside the processing chamber; and a robot having a movement range that spans the storage space and the processing chamber when the stocker is mounted on the machine tool, wherein the stocker includes a protective member that defines, in cooperation with the outer surface of the machine tool, a protective space when the stocker is mounted on the machine tool, the protective member being a fence or a wall, the protective space for accommodating the storage space therein.

This structure eliminates the need for employing a collaborative robot, which can implement an inexpensive structure. In addition, as the stocker is removable relative to the machine tool, the stocker can be demounted when the protective space is unnecessary and/or when it is unnecessary to drive the robot outside the processing chamber. This can prevent deterioration in operability.

In this case, the opening may be defined on the front side of the machine tool, and the protective space may be defined in front of the opening when the stocker is mounted on the machine tool. The protective member may cover at least the front side, the right side, and the left side of the protective space.

This structure enables utilization of an opening originally formed on the machine tool, so that only a small change in design of the machine tool is necessary.

The machine tool may further include an input device for receiving at least an instruction that instructs to drive the robot, and the input device may be provided outside the processing chamber and the protective space.

This structure allows an operator to safely instruct driving of the robot.

The machine tool system may further include a robot controller for controlling driving of the robot; a door sensor for detecting whether the door is open or closed; and a stocker sensor for detecting whether or not the stocker is mounted on the machine tool, wherein the robot controller may determine, based on the result of detection by the door sensor and the result of detection by the stocker sensor, whether or not to restrict the operation of the robot.

This structure can more reliably ensure the security of the robot.

The robot may be installed in the stocker.

This structure allows to drive the robot with the door of the machine tool closed even without a stocker mounted thereon.

The robot may be installed in the stocker.

This structure allows later installation of a robot in a machine tool that originally does not have a robot.

A stocker disclosed in this specification provides a storage space outside a processing chamber provided to a machine tool.

The stocker is removal relative to the machine tool, and the stocker includes a protective member that defines, in cooperation with the outer surface of the machine tool, a protective space when the stocker is mounted on the machine tool, the protective member being a fence or a wall, the protective space for accommodating the storage space.

This structure eliminates the need for employing a collaborative robot, so that an inexpensive structure can be implemented. Further, as the stocker is removable relative to the machine tool, the stocker can be removed when the protective space is unnecessary and/or when it is unnecessary to drive the robot outside the processing chamber. This can prevent deterioration in operability.

The technique disclosed in this specification makes it possible to implement an inexpensive structure with no need for employing a collaborative robot. Further, a stocker removable relative to a machine tool enables demounting of the stocker when a protective space is unnecessary and/or when it is unnecessary to drive the robot outside the processing chamber. This can prevent deterioration in operability.

BRIEF DESCRIPTION OF DRAWINGS

Embodiment(s) of the present disclosure will be described by reference to the following figures, wherein.

EMBODIMENTS

Figure 1:
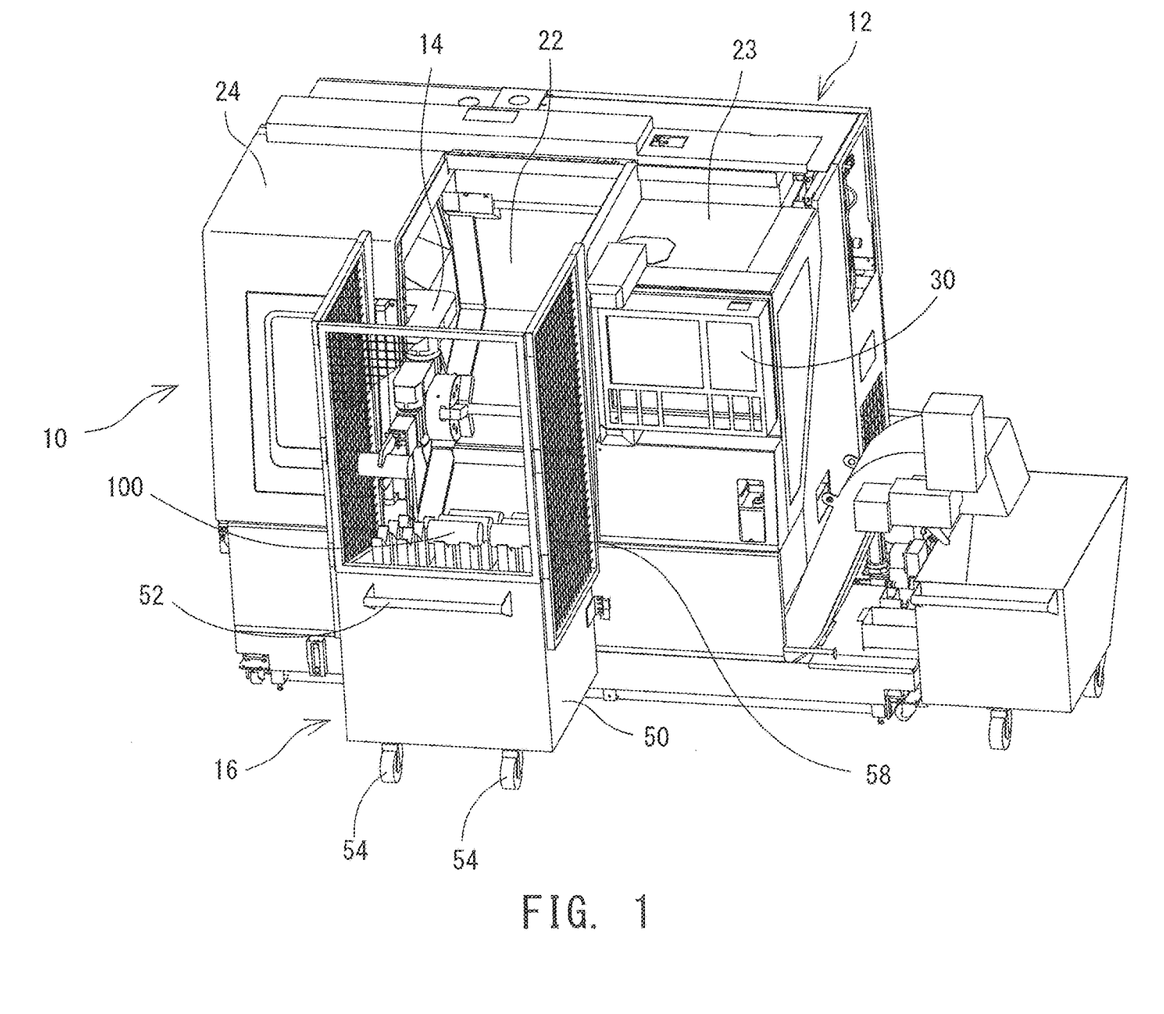
FIG. 1 is a perspective view of a machine tool system.
Figure 2:
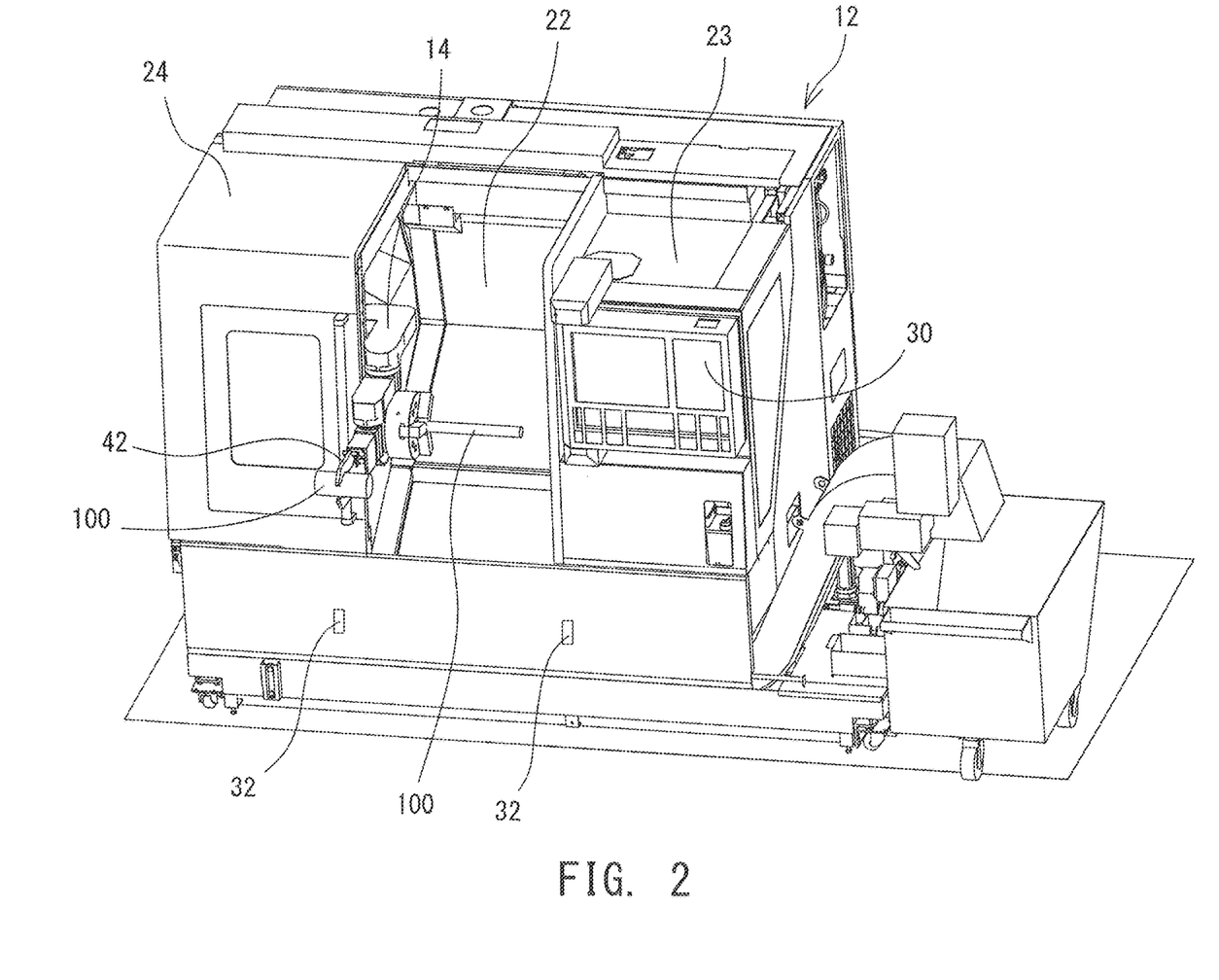
FIG. 2 is a perspective view of a machine tool with the front door left open.
Figure 3:
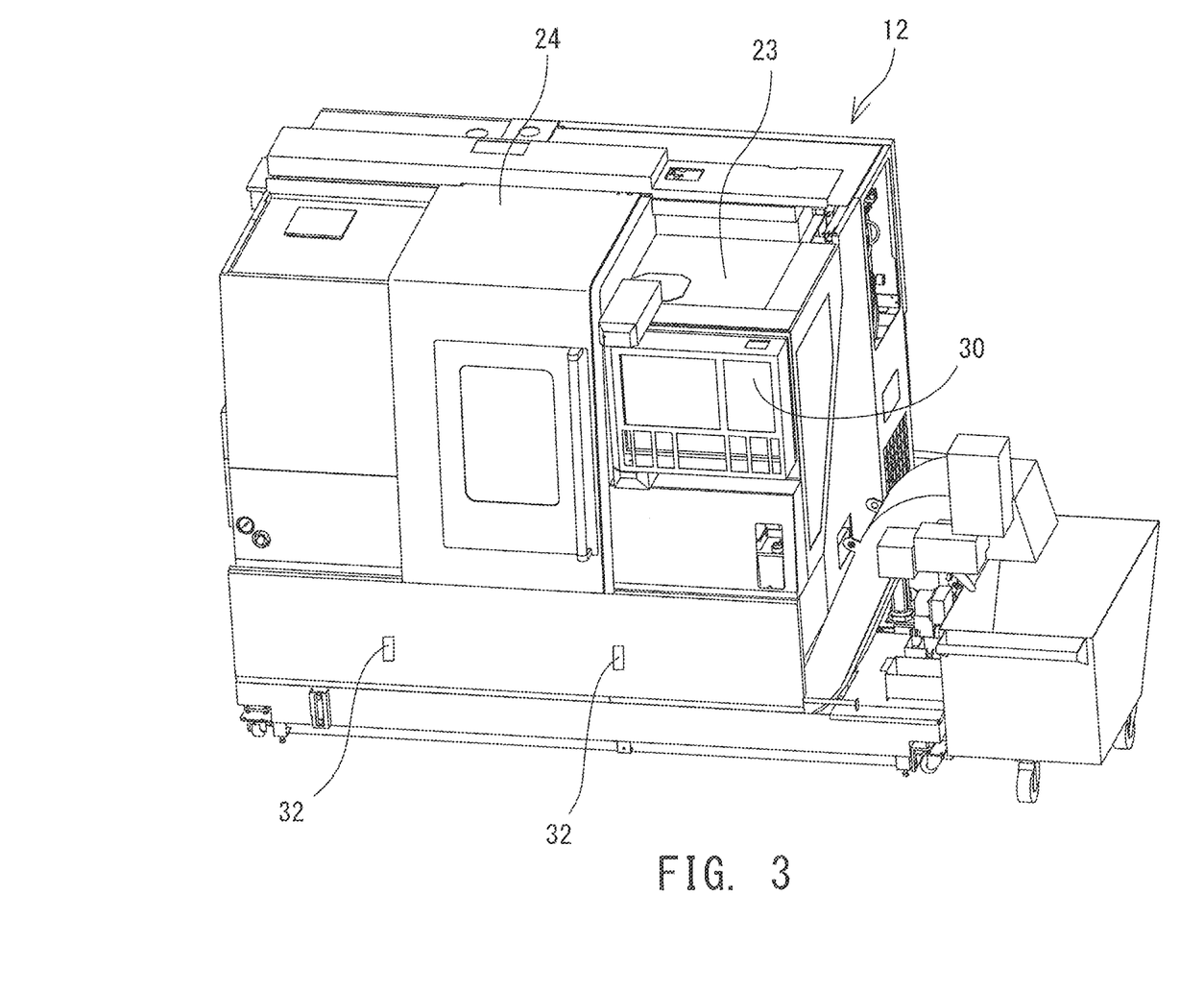
FIG. 3 is a perspective view of a machine tool with the front door closed.
Figure 4:
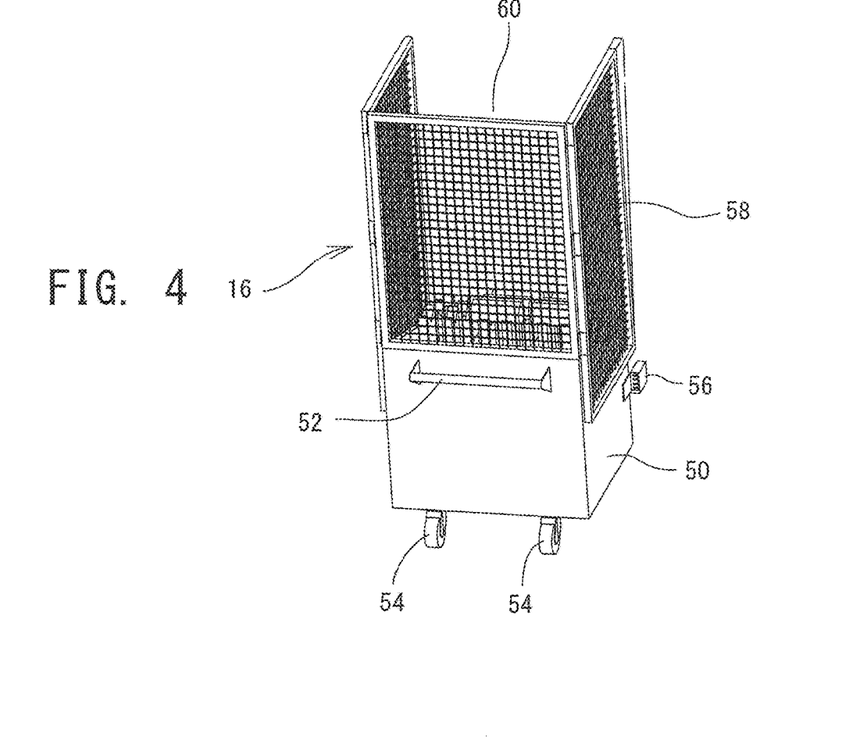
FIG. 4 is a perspective view of a stocker.
Figure 5:
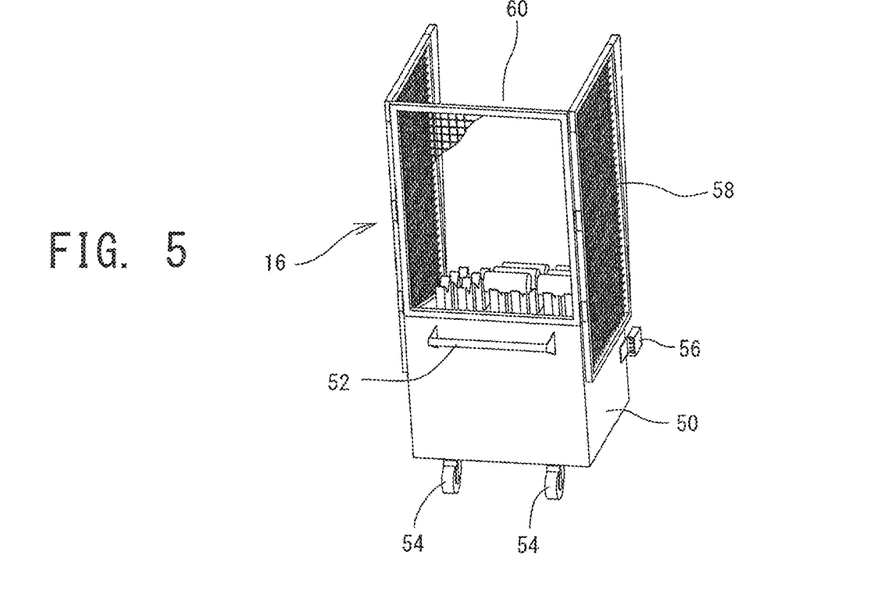
FIG. 5 is a perspective view of a stocker with a safety fence partially not illustrated.
Figure 6:
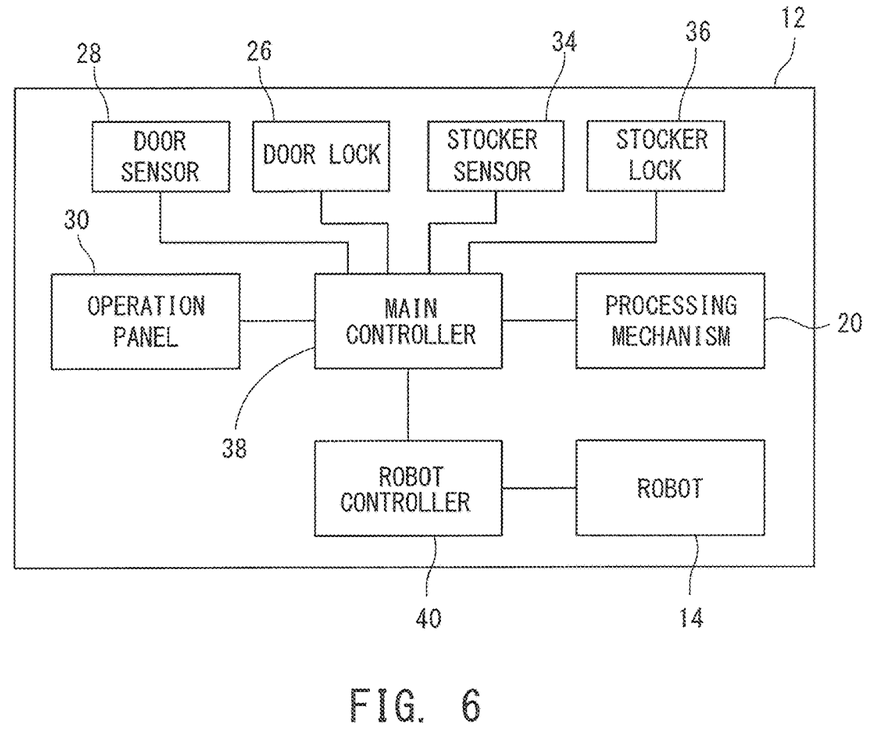
FIG. 6 is a functional block diagram of a machine tool.

A machine tool system 10 will now be described with reference to the drawings. FIG. 1 is a perspective view of the machine tool system 10. FIG. 2 and FIG. 3 are perspective views of a machine tool 12. FIG. 4 and FIG. 5 are perspective views of a stocker 16. FIG. 6 is a functional block diagram of the machine tool system 10. In FIG. 1 and FIG. 4, a safety fence 58, mounted on the front side of the stocker 16, is partially not illustrated.

The machine tool system 10 includes the machine tool 12, a robot 14, and the stocker 16. The machine tool 12 is a machine that processes workpieces 100 into a predetermined shape or size. Examples of the machine tool 12 include cutting tools (for example, lathes and milling machines), grinding tools (for example, grinders and surface finishing machines), casting tools, special processing tools (electric-discharge machining tools and supersonic machining tools), and multi-task machines, or combinations of such processing tools. In this example, the machine tool 12 is a turning center in the following description.

The robot 14 is an automatically controlled reprogrammable multi-purpose manipulator adapted to triaxial programming or programming for a larger number of axes. The robot 14 assists the machine tool 12 in processing, performs detection, and carries components or the like. The robot 14 is allowed to be driven only in an area off limits to people.

The stocker 16 is a structure for providing a storage space to the machine tool 12 and is removably mounted on the machine tool 12. The stocker 16 has the safety fence 58, to be described later. Once mounted on the machine tool 12, the stocker 16 defines a protective space outside the machine tool 12, the space being off limits to people. Formation of the protective space allows expansion of the area where the robot 14 can move to the outside of the machine tool 12 (to the inside of the protective space).

Details of the respective units of the machine tool system 10 will now be described. The machine tool 12 includes a processing mechanism 20 (see FIG. 6) for executing predetermined processing relative to a workpiece 100. The processing mechanism 20 includes, for example, a workpiece main shaft for rotatably holding the workpiece 100, a tool post for holding a turning tool, a movement mechanism for linearly moving the tool post, and a feeding mechanism for feeding cutting oil (these not illustrated). Having received an instruction (for example, a processing program) from an operator, a main controller 38, to be described later, of the machine tool 12 drives the processing mechanism 20 to process the workpiece 100.

Processing a workpiece 100 is executed inside a processing chamber 22. The processing chamber 22 is encased by a cover 23 on its circumferential surface. The cover 23 has an opening formed thereon. In the illustrated example, an opening expanding from the front surface to the upper surface of the machine tool 12 is formed substantially in the middle in the width direction of the machine tool 12.

The machine tool 12 further has a front door 24 that covers or uncover the opening. In this example, the front door 24 has a substantially L shape that extends from the front side toward the upper side of the machine tool 12 so that the front door 24 can fully cover the opening. The front door 24 is a sliding door that slides in the width direction. The front door 24, however, is not limited to a sliding door, and can be a rotating door for rotation around the hinge axis or a folding door to be partially folded, so long as the front door 24 can cover and uncover the opening. Closing the front door 24 leaves the processing chamber 22 isolated from the outside, whereby security for an operator is guaranteed. The front door 24 is opened or closed manually by an operator or automatically by the main controller 38.

The machine tool 12 has a door sensor 28 (for example, a safety switch) and a door lock 26 (see FIG. 6). The door sensor 28 detects whether the front door 24 is opened or closed. The door lock 26 prohibits opening the front door 24. The result of detection by the door sensor 28 is sent to the main controller 38 to be described later.

The machine tool 12 further has an operation panel 30 on the front surface of the machine tool 12. The operation panel 30 functions as an input device for receiving operation instructions from an operator, and includes a plurality of buttons, a keyboard, or a touch panel. The operation panel 30 is disposed at a position not interfering with the front door 24 or the stocker 16. The operation panel 30 is operable also with the front door 24 closed and the stocker 16 mounted on the machine tool 12. The illustrated example operation panel 30 is mounted on the machine tool 12. This, however, is not an exclusive example, and the operation panel 30 may be partially or entirely separated from the machine tool 12. For example, an information terminal for radio communication with the machine tool 12 (for example, smartphones, tablets) can be used as the operation panel 30. An instruction inputted by an operator via the operation panel 30 is sent to the main controller 38. The main controller 38 and a robot controller 40 control driving of the processing mechanism 20 and the robot 14, respectively, following the instruction from the operator.

The machine tool 12 further has a mounted portion 32 on a lower portion of the front surface of the machine tool 12. the stocker 16 to be described later is to be mounted on the mounted portion 32. The mounted portion 32 includes a stocker sensor 34 (for example, a safety switch) and a stocker lock 36 (see FIG. 6). The stocker sensor 34 detects whether or not the stocker 16 is mounted. The stocker lock 36 prohibits removal of the stocker 16. The stocker sensor 34 and the stocker lock 36 may be either the same structure or separate structures. For example, a safety switch with a solenoid may be used as the stocker sensor 34 and the stocker lock 36. The result of detection by the stocker sensor 34 is sent to the main controller 38.

The robot 14 is installed inside the processing chamber 22. The robot 14 has one or more end effectors 42. An end effecter 42 is a device to be mounted on the robot 14 to execute a predetermined task. Examples of the end effecter 42 may include hand mechanisms, various sensors, and fluid feeding mechanisms.

In this example, the robot 14 is a multi joint robot that has a plurality of joints for rotation around respective parallel axes. The multi joint robot is mounted on a wall surface of the processing chamber 22. The robot 14 has an end effecter 42, or a hand mechanism that can hold various members. The robot 14 moves within a predetermined range, or a movement range, that spans the inside and outside of the processing chamber 22, so that a part of the robot 14 can be located outside the processing chamber 22, as illustrated in FIG. 1 and FIG. 2. The robot controller 40, to be described later, controls driving of the robot 14 (including the end effecter 42).

The machine tool 12 further includes the main controller 38 and the robot controller 40 (see FIG. 6). The main controller 38 and the robot controller 40 may be made of a single structure or two or more structures. In either case, any controller or controllers constituting the main controller 38 and the robot controller 40 include a CPU for various operations and a memory for storing various programs and data. The main controller 38 receives an instruction from an operator, and accordingly controls driving of the processing mechanism 20. Specifically, the main controller 38 controls, for example, rotation of the workpiece main axis, movement of the tool post, and feeding of the cutting oil, in order to process a workpiece 100, following a processing program. When the door sensor 28 detects that the front door 24 is open, the main controller 38 restricts the operation of the processing mechanism 20. Thereupon, automatic driving of the processing mechanism 20 is prohibited, and only manual driving of the processing mechanism 20 with the speed restricted is allowed. While the processing mechanism 20 is automatically driven, the main controller 38 drives the door lock 26 to prohibit opening the front door 24. The main controller 38 automatically opens and closes the front door 24 when necessary.

The robot controller 40 controls driving of the robot 14 in accordance with an instruction from the main controller 38. The robot controller 40 restricts the operation of the robot 14 in accordance with the results of detections by the stocker sensor 34 and the door sensor 28, the results being notified via the main controller 38. Specifically, when the robot 14 is located in an area isolated from the outside; that is, when the front door 24 is closed or when the front door 24 is open with the stocker 16 mounted, the robot controller 40 automatically drives the robot 14 without restriction on the operation of the robot 14. Meanwhile, when the robot 14 is located in an area not isolated from the outside; that is, when the front door 24 is open with the stocker 16 not mounted, the robot controller 40 restricts the operation of the robot 14. On principle, restriction on the operation of the robot 14 means prohibition of driving of the robot 14. However, manual driving of the robot 14 may be allowed even while the operation of the robot 14 is restricted when the speed or output torque of the robot 14 can be fully controlled.

While the robot 14 is automatically driven, the main controller 38 keeps driving the door lock 26 and the stocker lock 36 to maintain the current condition of the space. That is, while the robot 14 is automatically driven with the front door 24 closed, the main controller 38 keeps the door lock 26 effective to prohibit opening of the front door 24. Meanwhile, while the robot 14 is automatically driven with the front door 24 open and the stocker 16 mounted, the main controller 38 keeps the stocker lock 36 effective to prohibit removal of the stocker 16.

As described above, the stocker 16 is a device that is removably mounted on the machine tool 12 to thereby define an additional storage space 60 outside the processing chamber 22. The stocker 16 includes a movable pedestal 50 and the safety fence 58 surrounding the space above the pedestal 50 in three directions. The space above the pedestal 50 constitutes the storage space 60 for storing various members (for example, workpieces 100, tools, chucks for exchange, and effectors for exchange). In FIG. 4 and FIG. 5, the stocker 16 for storing workpieces 100 is illustrated above the upper surface of the pedestal 50. The pedestal 50 has a handle 52 on the front surface thereof. The handle is held in moving the stocker 16. The pedestal 50 further has casters 54 on the bottom surface of the pedestal 50. The casters 54 assist the stocker 16 in moving.

The pedestal 50 has a mounting portion 56 to be removably mounted on the mounted portion 32 of the machine tool 12. The mounting portion 56 is mounted on the mounted portion 32 of the machine tool 12 whereby the position of the stocker 16 relative to the machine tool 12 is determined. The stocker 16, when mounted on the machine tool 12, is disposed in front of the opening of the machine tool 12. Thus, opening the front door 24 of the machine tool 12 leaves the processing chamber 22 communicating with the storage space 60 inside the stocker 16.

The storage space 60, or a space above the pedestal 50, is encircled by the safety fence 58 in three directions. In other words, the safety fence 58 is mounted on the front, right, and left respective sides of the storage space 60. There is no safety fence 58 on the rear and upper sides of the storage space 60, leaving the storage space 60 open to the outside on these sides. The safety fence 58 is sufficiently long to reach to substantially the same height as that of the upper surface of the machine tool 12.

With the stocker 16 mounted on the machine tool 12, the rear end of the safety fence 58 is positioned close to the front surface (the cover 23) of the machine tool 12, leaving the gap between the rear end of the safety fence 58 and the front surface of the machine tool 12 so small that does not allow a person to pass his/her hand through the gap. In other words, mounting the stocker 16 on the machine tool 12 results in formation of a protective space defined by the safety fence 58 in cooperation with the outer surface of the machine tool 12, the protective space being isolated from the outside. The storage space 60 of the stocker 16 is located inside the protective space. Formation of the protective space outside the machine tool 12 enables expansion of the movement range of the robot 14 to the outside (the storage space 60 of the stocker 16) of the machine tool 12. Note that although a "fence" with gaps is used as a protective member encircling the storage space 60 in this example, a "wall" without gaps may be used instead of a "fence" when a wall can prevent intrusion of people.

The reason for providing the stocker 16 with the safety fence 58, as described above, will now be described. The machine tool 12 has conventionally been demanded to implement further automation and manpower saving. To meet this demand, it is suggested that the robot 14 be installed in the processing chamber 22 so that the robot 14 can transport various members (for example, workpieces 100 and tools). Specifically, it is suggested that the robot 14 carry processed workpieces 100 and/or used tools to the outside of the processing chamber 22 and fresh workpieces 10 and/or tools from the outside to the inside of the processing chamber 22.

Note here, according to the laws and standards, the robot 14 shall be physically separated from people by fences or bars or shall be a collaborative robot. Collaborative robots refer to robots 14 that can operate in cooperation with people, including, for example, robots whose speed and distance to people can be monitored and/or whose torque and/or pressure to apply can be restricted.

Accordingly, when it is wished to have the robot 14 move to the outside of the processing chamber 22 to carry workpieces 100 and/or tools, a fence or bars need to be set around the robot 14. Alternatively, the robot 14 should be a collaborate robot. A collaborate robot should be equipped with expensive sensors, such as a laser range-finder for detection of distances to people and a torque sensor for detection of torque.

In view of the above, the machine tool system 10 disclosed in this specification includes a stocker 16 with the safety fence 58 so that a protective space where the robot 14 is separated from people can be formed outside the machine tool 12. This structure allows the robot 14 to automatically access the outside of the processing chamber 22 even without use of an expensive collaborate robot. As a result, it is unnecessary for the robot 14 to be a collaborative robot, which can implement an inexpensive robot 14.

In this example, since the stocker 16 is removable relative to the machine tool 12, it is possible to form a protective space outside the machine tool 12 only when the space is necessary. As a result, the machine tool 12 functions as an automated tool that automatically exchanges workpieces 100, for example, when the stocker 16 is mounted, and functions as a general-purpose device for manual exchange of workpieces 100 when the stocker 16 is not mounted. This enables use of the machine tool in such a manner that, for example, unmanned large-scale production is executed at night and manned small-scale production is executed in the daytime.

As is obvious from the above description, in this example the stocker 16 communicates with the processing chamber 22 through an existing opening. This structure eliminates the need for formation of a dedicated opening or door. This contributes to reduction in cost of the machine tool system 10. Moreover, in this example the operation panel 30 is positioned outside the processing chamber 22 and the protective space when the stocker 16 is mounted on the machine tool 12. This allows an operator to safely operate the operation panel 30 even while the processing mechanism 20 and/or the robot 14 are automatically driven.

Figure 7:
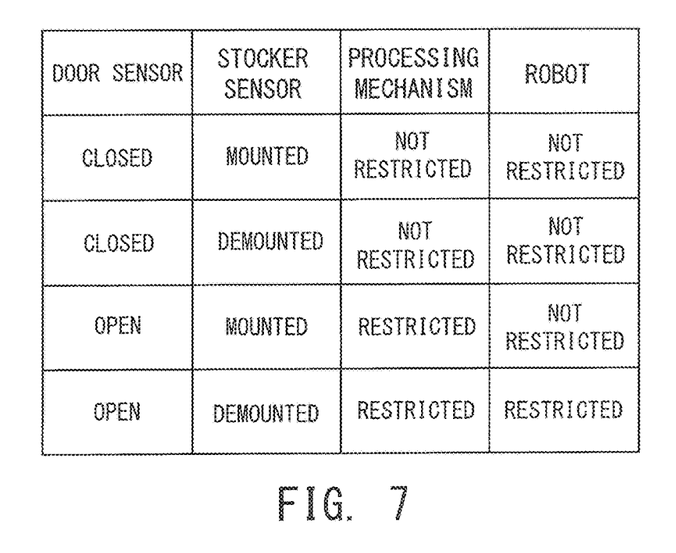
FIG. 7 illustrates the relationship between the result of detections by a door sensor and a stocker sensor and effectiveness/ineffectiveness of restriction on the operation of a machine tool and a robot.

FIG. 7 illustrates the relationship between the results of detections by the door sensor 28 and the stocker sensor 34 and effectiveness/ineffectiveness of restriction on the operations of the processing mechanism 20 and the robot 14. As illustrated in FIG. 7, the operation of the processing mechanism 20 is restricted whenever the front door 24 is open, regardless of whether or not the stocker 16 is mounted.

The robot 14 is driven without restriction on the operation whenever the front door 24 is closed, regardless of whether or not the stocker 16 is mounted. In this case, naturally, the range of movement of the robot 14 is limited to the inside of the processing chamber 22. Additionally, the robot 14 is driven without restriction on the operation also when the front door 24 is open and the stocker 16 is mounted. In this case, the range of movement of the robot 14 is as large as one expanding to the storage space 60 of the stocker 16 outside the processing chamber 22. Meanwhile, operation of the robot 14 is restricted (suspended from being driven) when the front door 24 is open and the stocker 16 is not mounted.

For unmanned processing of mass-produced products at night, for example, processing workpieces 100 with the front door 24 closed and exchanging workpieces 100 with the front door 24 open are alternately and repetitively executed. In the above, the main controller 38 automatically opens and closes the front door 24.

Figure 8:
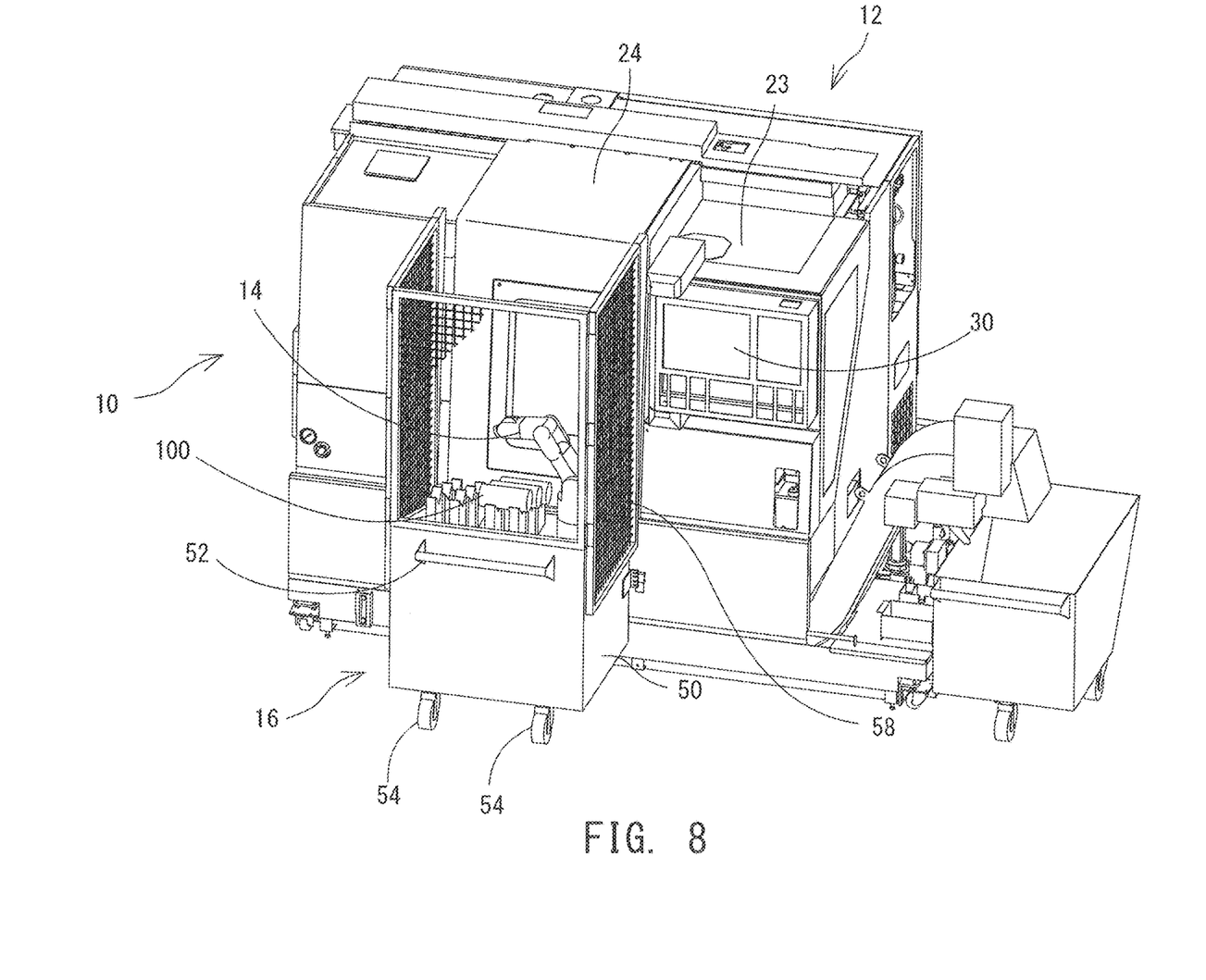
FIG. 8 is a perspective view of a different type of machine tool system.
Figure 9:
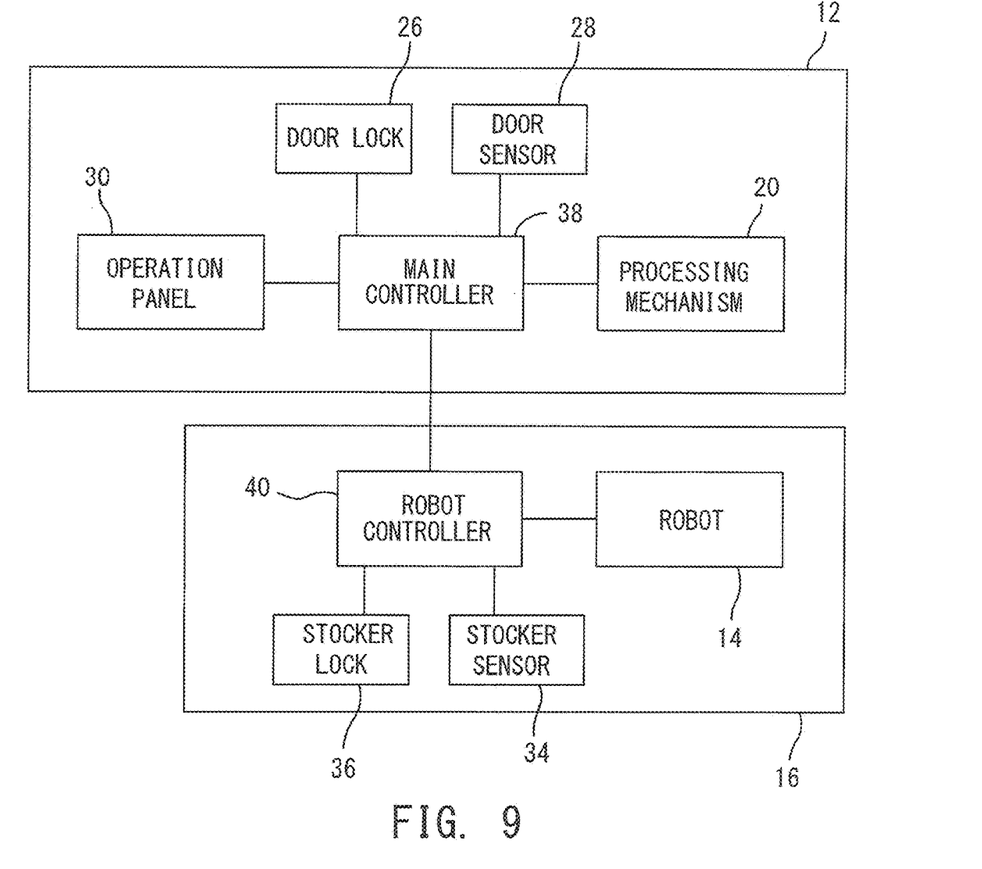
FIG. 9 is a functional block diagram of the machine tool system in FIG. 8.
Figure 10:
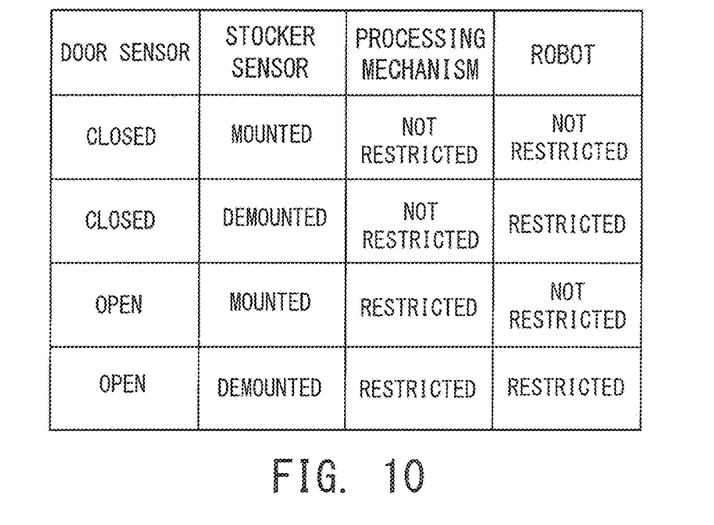
FIG. 10 illustrates the relationship between the result of detections by the door sensor and the stocker sensor and effectiveness/ineffectiveness of restriction on the operation of the machine tool and the robot of the machine tool system illustrated in FIG. 8.

One example of other types of machine tool system 10 will now be described, with reference to FIG. 8 to FIG. 10. FIG. 8 is a perspective view of another type of machine tool system 10. FIG. 9 is a functional block diagram of that machine tool system 10. FIG. 10 illustrates the relationship between the results of detections by the door sensor 28 and the stocker sensor 34 of that machine tool system 10 and effectiveness/ineffectiveness of restriction on the operations of the processing mechanism 20 and the robot 14.

The machine tool system 10 includes the robot 14, the robot controller 40, the stocker sensor 34, and the stocker lock 36, all being mounted in the stocker 16, rather than in the machine tool 12. With the stocker 16 mounted on the machine tool 12, the robot controller 40 can communicate by wire or radio with the main controller 38 of the machine tool 12. Then, the robot controller 40 drives the robot 14 in response to an instruction from the main controller 38. Based on the result of detection by the stocker sensor 34, the robot controller 40 determines whether or not to make restriction on the operation of the robot 14 effective.

Since the robot 14 is installed outside the processing chamber 22 in this example, the operation of the robot 14 is restricted when the stocker 16 is not mounted on the machine tool 12 even while the front door 24 is closed. This structure with the robot 14 installed in the stocker 16 allows later installation of the robot 14 in the machine tool 12 that originally does not have a robot 14. In this case, the stocker 16 may have an input unit (for example, an operation panel or an operation button) for receiving an operation instruction for the robot 14.

In another embodiment, the robot 14 may be installed in front of the machine tool 12 and encircled by the safety fence 58 of the stocker 16. That is, the robot 14 may be separated from both the stocker 16 and the machine tool 12.

In either case, structures other than provision of the stocker 16 having a protective member (a fence or a wall) can be desirably modified, in which the protective member (a fence or a wall) defines a protective space in cooperation with the outer surface of the machine tool 12 when the stocker 16 is removably mounted on the machine tool 12, and the protective space accommodates the storage space 60.

REFERENCE SIGNS LIST

10 machine tool system, 12 machine tool, 14 robot, 16 stocker, 20 processing mechanism, 22 processing chamber, 23 cover, 24 front door, 26 door lock, 28 door sensor, 30 operation panel, 32 mounted portion, 34 stocker sensor, 36 stocker lock, 38 main controller, 40 robot controller, 42 end effecter, 50 pedestal, 52 handle, 54 caster, 56 mounting portion, 58 safety fence, 60 storage space, 100 workpiece.

The invention claimed is:

1. A machine tool system comprising:
a machine tool including a processing chamber and a door, the processing chamber being covered by a cover having a door opening, the door for covering or uncovering the door opening;
a stocker for being removably mounted on the machine tool, positioned outside the processing chamber, encircled in three peripheral directions each by a protective member which is a fence or a wall, and having a stocker opening in a remaining one peripheral direction; and
a robot,
wherein
when the stocker is mounted on the machine tool, a storage space encircled by the protective member is in communication with the processing chamber through the stocker opening and the door opening, and ends of the protective member positioned at both sides of the stocker opening are positioned in proximity of or come in contact with the cover to an extent to prevent entrance of a human, and when the stocker is mounted on the machine tool, the robot moves in a movement range that spans the storage space and the processing chamber.

2. The machine tool system according to claim 1, wherein the door opening is defined on a front side of the machine tool, the storage space is positioned in front of the door opening when the stocker is mounted on the machine tool, and the protective member covers at least a front side, a right side, and a left side of the storage space.

3. The machine tool system according to claim 1, wherein the machine tool further comprises an input device for receiving at least an instruction that instructs to drive the robot, and
the input device is provided outside the processing chamber and the storage space.

4. The machine tool system according to claim 1, further comprising:
a robot controller for controlling driving of the robot;
a door sensor for detecting whether the door is open or closed; and
a stocker sensor for detecting whether or not the stocker is mounted on the machine tool,
wherein
the robot controller determines, based on a result of detection by the door sensor and a result of detection by the stocker sensor, whether or not to restrict an operation of the robot.

5. The machine tool system according to claim 1, wherein the robot is installed inside the processing chamber.

6. The machine tool system according to claim 1, wherein the robot is installed in the stocker.

7. A stocker positioned outside a processing chamber provided to a machine tool, wherein
the stocker is removable relative to the machine tool, is encircled in three peripheral directions each by a protective member which is a fence or a wall, and has a stocker opening in a remaining one peripheral direction, and
when the stocker is mounted on the machine tool, a storage space encircled by the protective member is in communication with the processing chamber through the stocker opening and the door opening, and ends of the protective member positioned at both sides of the stocker opening are positioned in proximity of or come in contact with the cover to an extent to prevent entrance of a part of a human body.

* * * * *